United States Patent
Emmons

(10) Patent No.: US 9,834,482 B2
(45) Date of Patent: Dec. 5, 2017

(54) SYSTEM AND METHOD FOR INTERNAL PRESSURIZED GAS DRYING OF CONCRETE

(71) Applicant: Structural Group, Inc., Hanover, MD (US)

(72) Inventor: Peter H. Emmons, Ft. Lauderdale, FL (US)

( * ) Notice: Subject to any disclaimer, the term of this patent is extended or adjusted under 35 U.S.C. 154(b) by 962 days.

(21) Appl. No.: 14/046,126

(22) Filed: Oct. 4, 2013

(65) Prior Publication Data

US 2014/0099874 A1    Apr. 10, 2014

Related U.S. Application Data

(60) Provisional application No. 61/744,919, filed on Oct. 5, 2012.

(51) Int. Cl.
    *C04B 41/00*      (2006.01)
    *F26B 21/00*      (2006.01)
    (Continued)

(52) U.S. Cl.
    CPC ............ *C04B 41/00* (2013.01); *C04B 41/009* (2013.01); *C04B 41/5009* (2013.01);
    (Continued)

(58) Field of Classification Search
    CPC ................................................... C04B 41/00
    (Continued)

(56) References Cited

U.S. PATENT DOCUMENTS

| | | | | |
|---|---|---|---|---|
| 3,324,846 A | * | 6/1967 | Smith | ............... A63C 19/12 |
| | | | | 126/271.1 |
| 4,002,708 A | * | 1/1977 | Lott | ............... B28B 11/042 |
| | | | | 264/133 |

(Continued)

FOREIGN PATENT DOCUMENTS

| | | |
|---|---|---|
| DE | 3632424 | 4/1988 |
| EP | 1131497 | 6/2003 |

(Continued)

OTHER PUBLICATIONS

"Selecting Measures to Prevent Deleterious Alkali-Silica Reaction in Concrete. Rationale for the AASHTO PP65 Prescriptive Approach." U.S. Department of Transportation Federal Highway Administration. Oct. 2012. 58 Pages.

(Continued)

*Primary Examiner* — Steven B McAllister
*Assistant Examiner* — Samantha Miller
(74) *Attorney, Agent, or Firm* — Whiteford, Taylor & Preston, LLP; Gregory M. Stone

(57) ABSTRACT

A system and method are disclosed for lowering the internal relative humidity inside of a concrete structure by applying a pressurized gas and forcing such pressurized gas into the concrete structure, in turn driving moisture in the pores of the concrete to the exterior of the structure. Pressurized gas is supplied to a network of sealed cavities extending into the face of the concrete structure, ultimately causing the gas to move into the concrete structure through pores and capillaries through the structure, in turn driving moisture in the concrete structure toward the surface. Optionally, a competitive inhibiting agent, such as lithium nitrate, may also be provided to stabilize the concrete structure against future deleterious expansions caused by moisture uptake in the existing ASR gel.

17 Claims, 5 Drawing Sheets

(51) Int. Cl.
*C04B 41/50* (2006.01)
*C04B 41/65* (2006.01)
*F26B 3/06* (2006.01)

(52) U.S. Cl.
CPC ............... *C04B 41/65* (2013.01); *F26B 3/06* (2013.01); *F26B 21/003* (2013.01)

(58) Field of Classification Search
USPC ......................................................... 454/305
See application file for complete search history.

(56) References Cited

U.S. PATENT DOCUMENTS

| | | | | |
|---|---|---|---|---|
| 4,061,483 A * | 12/1977 | Burg | ...................... | A23B 4/066 165/223 |
| 4,211,571 A * | 7/1980 | Hartmann | ............... | C04B 28/18 106/641 |
| 4,779,673 A | 10/1988 | Chiles et al. | | |
| 4,911,353 A * | 3/1990 | Deakin | ................. | F24J 2/0488 126/634 |
| 5,611,921 A * | 3/1997 | Deskins | ................ | B01D 24/22 210/195.1 |
| 5,662,731 A * | 9/1997 | Andersen | ............. | B01F 3/1214 106/206.1 |
| 5,679,145 A * | 10/1997 | Andersen | ............. | B01F 3/1214 106/162.5 |
| 5,744,078 A * | 4/1998 | Soroushian | ............ | C04B 28/02 264/101 |
| 5,837,315 A | 11/1998 | Foltz et al. | | |
| 6,046,255 A * | 4/2000 | Gray | ................... | B01F 3/04049 261/DIG. 26 |
| 6,110,316 A * | 8/2000 | Kobayashi | .............. | B41M 3/12 156/230 |
| 6,627,065 B1 * | 9/2003 | MacDowell | ............ | C23F 13/02 106/284.03 |
| 7,125,441 B1 * | 10/2006 | Furman | ................... | C04B 28/02 106/14.13 |
| 2003/0235306 A1 * | 12/2003 | Fox | ..................... | G06F 21/6209 380/255 |
| 2005/0200684 A1 * | 9/2005 | Sakurada | ................... | B41J 3/28 347/105 |
| 2006/0006114 A1 * | 1/2006 | Deskins | ............. | B01D 21/0012 210/724 |
| 2007/0196711 A1 * | 8/2007 | Takeguchi | ........ | H01M 8/04156 429/483 |
| 2008/0174041 A1 * | 7/2008 | Firedman | .............. | B28B 1/0873 264/71 |
| 2009/0189617 A1 * | 7/2009 | Burns | ..................... | E21B 43/24 324/649 |
| 2010/0116030 A1 * | 5/2010 | Khan | ..................... | G01N 15/08 73/38 |
| 2010/0310418 A1 * | 12/2010 | Mason | ...................... | A61L 2/20 422/37 |
| 2011/0132191 A1 * | 6/2011 | Fredenhagen | ......... | B01D 53/06 95/14 |
| 2012/0060958 A1 * | 3/2012 | Anguelov | ................ | E04C 3/28 138/103 |
| 2012/0079876 A1 * | 4/2012 | Stroock | .................. | G01N 13/02 73/64.51 |
| 2012/0201996 A1 * | 8/2012 | Meyer | ...................... | E04C 3/26 428/69 |
| 2013/0109804 A1 * | 5/2013 | Kusaka | ............... | C08F 290/067 524/590 |
| 2013/0303662 A1 * | 11/2013 | Guzzetta | ................ | C04B 28/02 524/5 |
| 2014/0023491 A1 * | 1/2014 | Ruck | ...................... | F01D 25/24 415/183 |

FOREIGN PATENT DOCUMENTS

| | | |
|---|---|---|
| WO | 9423142 | 10/1994 |
| WO | 00/29679 | 5/2000 |
| WO | 2005047792 | 5/2005 |
| WO | 2012079173 | 6/2012 |

OTHER PUBLICATIONS

Farny, James A. and Steven H. Kosmatka. "Diagnosis and Control of Alkali-Aggregate Reactions in Concrete." Port;amnd Cement Association. 1997. 24 pages.

* cited by examiner

SYSTEM AND METHOD FOR INTERNAL PRESSURIZED GAS DRYING OF CONCRETE

CROSS-REFERENCE TO RELATED APPLICATION

This application is based upon and claims priority from U.S. Provisional Patent Application Ser. No. 61/744,919 entitled "Internal pressurized gas drying of concrete," filed with the United States Patent and Trademark Office on Oct. 5, 2012, by the inventor herein, the specification of which is incorporated herein by reference in its entirety.

BACKGROUND OF THE PRIOR ART

Field of the Invention

The present invention relates to systems and methods for drying concrete, and more particularly to a system and method for lowering the internal relative humidity inside of a concrete structure through application of a pressurized gas to drive moisture from the pores inside of such concrete structure.

Background of the Prior Art

Moisture in concrete structures can have significantly negative effects on the structural integrity and longevity of such structures. Alkali Silica Reaction, or "ASR," causes concrete to swell and crack and loose important mechanical and durability properties. Similarly, Alkali Carbonate Reaction, or "ACR," involves a similar reaction but with dolomitic rocks. A reaction product, alkali-silica gel, is typically observed in concrete that is affected by ASR.

ASR is a chemical reaction between the alkali hydroxides in the pore solution of the concrete and certain forms of reactive silica minerals occurring in some aggregates. The reaction product, an alkali-silica gel, is hygroscopic, and will absorb water and swell if the concrete is in a moist environment. The swelling of the gel can, under certain circumstances, lead to expansion and cracking of the concrete.

A sufficient supply of moisture is required in order for the gel to swell and to thus cause such negative effects. More particularly, an internal relative humidity inside of the concrete structure of 80% is required to sustain such a negatively moist environment. In existing ASR affected structures, the rate of reaction, and thus the rate of damage accumulation, may be reduced by lowering the internal relative humidity.

Thus, there remains a need in the art for a simple system and method for use in an existing concrete structure that is capable of lowering the relative humidity inside of the concrete structure below 80%, and maintaining the internal relative humidity below 80%, to minimize the opportunity for the gel reaction product to absorb water, swell, and cause damage to the concrete structure.

SUMMARY OF THE INVENTION

Disclosed is a system and method for lowering the internal relative humidity inside of a concrete structure by applying a pressurized gas and forcing such pressurized gas into the concrete structure, in turn driving moisture in the pores of the concrete to the exterior of the structure. Pressurized gas is supplied to a network of sealed cavities extending into the face of the concrete structure, ultimately causing the gas to move into the concrete structure through pores and capillaries through the structure, in turn driving moisture in the concrete structure toward the surface. Optionally, a competitive inhibiting agent, such as lithium nitrate, may also be provided to stabilize the existing gel against further detrimental expansion from the ongoing ASR.

With regard to certain aspects of the invention, a system is provided for lowering the internal relative humidity of a concrete structure, which includes a plurality of cavities extending into a face of the concrete structure and sealed at a top end of each cavity, a gas delivery nozzle positioned within each cavity, and a pressurized gas source in fluid communication with the nozzles and delivering pressurized gas to the cavities at a pressure sufficient to cause gas to enter into said concrete structure and to lower an internal relative humidity of the concrete structure.

With regard to further aspects of the invention, a method is provided for lowering the internal relative humidity of a concrete structure, which includes the steps of selecting an area of a concrete structure that is to be subjected to treatment for lowering an internal relative humidity of the concrete structure, forming a plurality of cavities extending into a face of the concrete structure, positioning gas supply nozzles in each cavity and sealing each cavity, supplying pressurized gas to the cavities through the nozzles, and continuing the supply of pressurized gas to the cavities until an equilibrium condition is achieved in which an internal relative humidity of the area of the concrete structure is less than 80%.

BRIEF DESCRIPTION OF THE DRAWINGS

The numerous advantages of the present invention may be better understood by those skilled in the art by reference to the accompanying figures in which.

DETAILED DESCRIPTION

Figure 1:
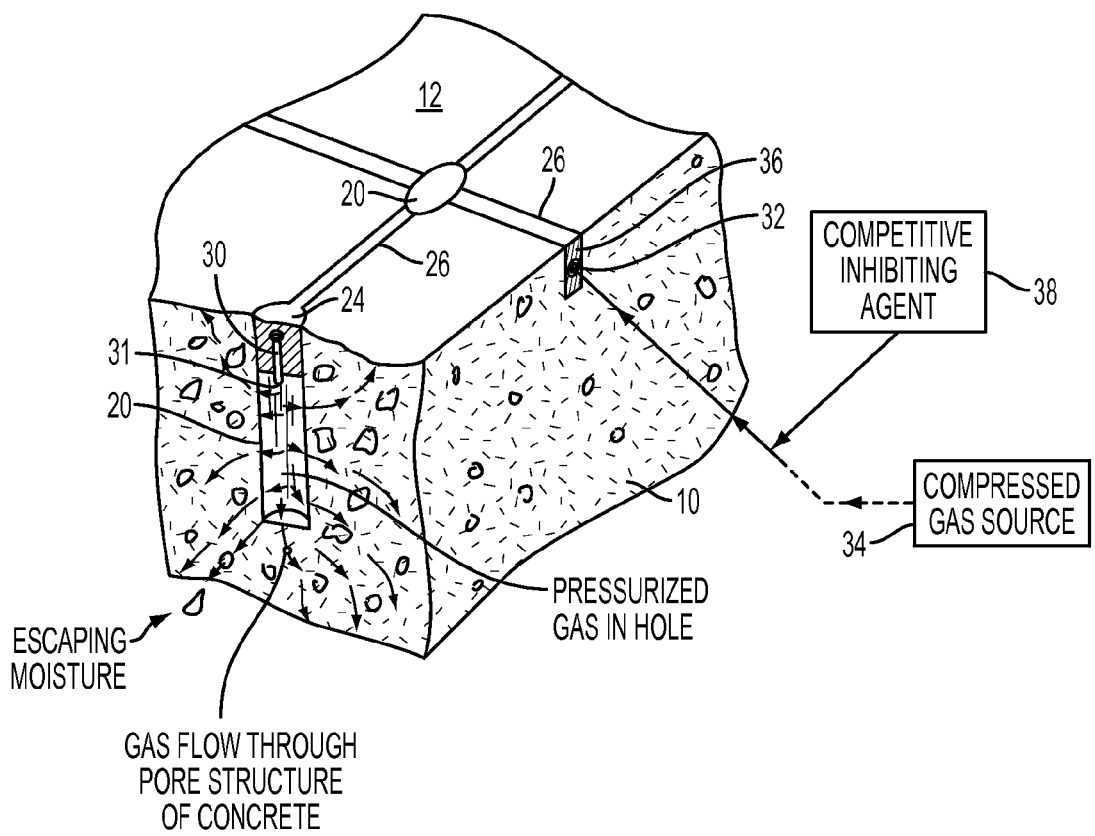
FIG. 1 shows a perspective, cross-sectional view of a portion of a concrete structure including a system for lowering the internal relative humidity inside of the concrete structure in accordance with certain aspects of an embodiment of the invention.

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed is a system and method for lowering the internal relative humidity inside of a concrete structure by applying a pressurized gas and forcing such pressurized gas into the concrete structure, in turn driving moisture in the pores of the concrete to the exterior of the structure. With particular reference to the schematic, sectional view of a section of a concrete structure 10 of FIG. 1, a plurality of generally cylindrical cavities 20 are cut into the face 12 of the concrete structure. Cylindrical cavities 20 are formed to a depth penetrating the affected concrete requiring treatment. Such cavities 20 do not, however, penetrate through the structure so as to provide a sealed end of the hole to maintain pressure within the hole. Within each cavity 20, a gas supply nozzle 30 is positioned, having a nozzle outlet 31 that is open to the interior of its respective cavity 20, and is housed within a seal 24 that provides an air-tight seal at the upper end of each cavity 20. Fluid supply conduit 32 extends through the concrete structure between adjacent cavities, and is fluidly connected to a compressed gas source 34 to supply gas to the plurality of cavities 20 in the concrete structure. Gas that is held in a pressurized condition at compressed gas source 34 is ultimately delivered to each cavity 20 and is pumped into each cavity 20 so as to increase the pressure within each such cavity 20, which ultimately causes the gas to move into the concrete structure through pores and capillaries throughout the structure, in turn driving moisture in the concrete structure toward the surface opposite face 12. Depending upon the density of the concrete making up concrete structure 10, the acting hydrostatic pressure will force moisture (and more particularly internal relative humidity within concrete structure 10) to drop until an equilibrium condition is reached. Once the internal relative humidity of the concrete structure 10 falls below 80% (as measured, for instance, by a humidity sensor of typical construction and as known to those of ordinary skill in the art), the risk of gel expansion in the concrete structure 10 is minimized or potentially eliminated altogether. In order to maintain a relative humidity of less than 80%, the gas may be maintained by compressed gas source 34 at the pressure that creates an equilibrium condition in which the relative humidity is less than 80%, such as by continuously or intermittently pumping additional gas from compressed gas source 34 to cavities 20 as the gas continuously seeps into the concrete structure 10. Optionally, to further enhance the dehydration process, a substance 38 (and preferably a competitive inhibiting agent that will block absorption of alkali metals) may be introduced into the cavity 20 in addition to the compressed gas that will stabilize the gel against further deleterious expansion. That competitive inhibiting agent may comprise lithium nitrate, which may be supplied (such as in a drip solution) with the pressurized gas and ultimately absorbed into the ASR gel to make the gel far less hydroscopic, and thus nondeleteriously expansive.

Figure 2:
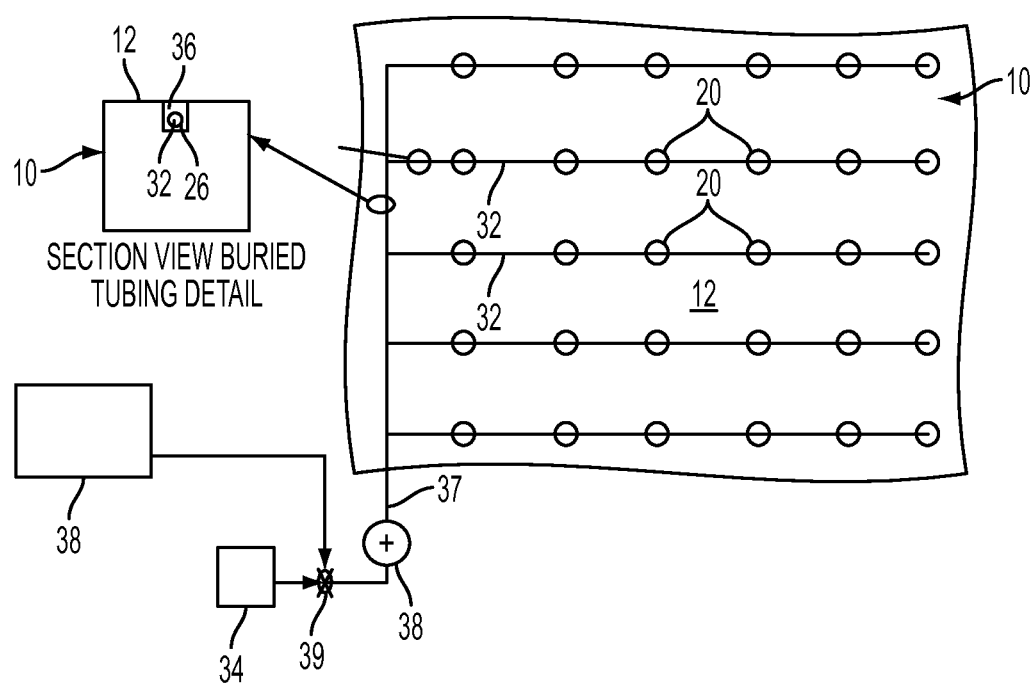
FIG. 2 illustrates a schematic view of an arrangement of cavities extending into the face of a concrete structure in accordance with certain aspects of an embodiment of the invention.

As shown in the schematic view of FIG. 2, cavities 20 are preferably arranged in a uniform pattern or network across face 12 of an area of concrete structure 10 that is to be treated; i.e., they are preferably situated at evenly spaced intervals across the face 12 of the area to be treated, with each cavity being formed with approximately equal depths and diameters. Each hole is formed to a depth that extends into the concrete structure but that does not pass all of the way through the concrete structure 10, such that with the top of the cavity 20 sealed, a generally air-tight chamber is formed. Cavities 20 may be formed by rotary percussion, rotary core drilling, high pressure water lancing or cutting, or by any other manner suitable for drilling or otherwise forming a bore-type cavity in a concrete structure as may be known to those of ordinary skill in the art. Once formed, each cavity 20 is preferably cleaned so as to remove laitenance, drilling residue, or other pore-clogging materials from the newly formed cavity 20. Cleaning of holes 20 may be accomplished by water flushing under high pressure and at low pressure, air blasting, acid cleaning (muriatic), abrasive blasting, sponge blasting, shot blasting, or any other method suitable for cleaning potentially pore-clogging material from the concrete walls of cavities 20 as may be known to those of ordinary skill in the art. An optimal hole spacing and sizing may vary from application to application, and will depend upon the density of the particular concrete structure 10 that is being treated, the thickness of the concrete structure 10 being treated, the source of moisture that is entering the concrete, crack and joint spacing within concrete structure 10, location of reinforcing steel within concrete structure 10, and the size of aggregates within concrete structure 10.

Preferably, and as shown in the sectional view of the encased tubing 32 in FIG. 2, channels 26 extend through concrete structure 10 between adjacent cavities 20 so that fluid supply conduit 32 may be extended through concrete structure 10. Such channels 26 may be formed by saw cutting a channel into the face 12 of concrete structure 10 in a straight line between adjacent cavities 20, or by any other concrete-cutting method as discussed above and as may be known to those of ordinary skill in the art. After the channel 26 has been cut into the face 12 of concrete structure 10, a section of fluid supply conduit 32 may be placed into such channel 26, with such section of fluid supply conduit 32 being fluidly attached to gas supply nozzles positioned within cavities 20. Once all of the gas supply nozzles 31 and sections of fluid supply conduit 32 are so positioned within the network, the fluid supply conduit 32 and at least a portion of gas supply nozzles 30 (of course leaving the nozzle outlet open) may be encased within an encasement material 36 to hold them in place, and so as to form an air-tight "plug" at the top of each cavity 20. For example, gas supply nozzles 31 and fluid supply conduit 32 may be encased within an epoxy or other encasement material suitable for permanently burying them within face 12 of concrete structure 10, while maintaining a flush, smooth surface on face 12.

Figure 3:
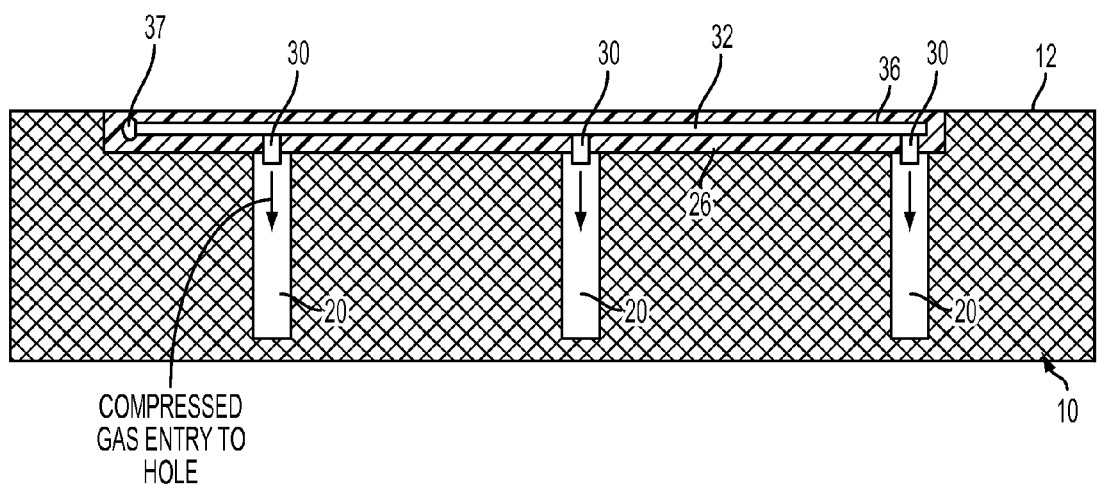
FIG. 3 shows a side, cross-sectional view of the portion of a concrete structure of FIG. 1.

As shown in the cross-sectional view of FIG. 3, a branch of fluid supply conduit 32 may extend from a distribution line 37. Each such branch of fluid supply conduit 32 may feed the pressurized gas to a single row of cavities 20, while distribution line 37 feeds each such branch. Distribution line 37 may also be encased in encasement material 36 as it extends through a channel 26 through concrete structure 10. As the branch of fluid supply conduit 32 extends off of distribution line 37, individual gas supply nozzles 30 are attached to the fluid supply conduit 32. An inlet side of each gas supply nozzle 30 attaches directly to supply conduit 32 and is encased within encasement material 36, while the opposite end terminates in nozzle outlet 31 which is positioned within the open interior of cavity 20.

Again with reference to FIG. 2, compressed gas source 34 supplies compressed gas through distribution line 37 to individual branches of fluid supply conduit 32, and then through individual gas supply nozzles 30 into each cavity 20. A pressure regulator 38 may be provided upstream of the network of cavities 20 so as to regulate the pressure of gas that is ultimately delivered to each cavity 20, even if the supply at compressed gas source 34 is maintained at a higher level than desired in cavities 20. The particular gas that is supplied from compressed gas source 34 may comprise atmospheric air, although it is envisaged that other gases or gas blends may be used, it being important in gas selection that any such gas or gas blend be capable of drying the treated portion of concrete structure 10. Likewise, the particular pressure that should be used to pressurize such gas may vary from application to application, and will be based upon the acting hydrostatic pressure within the portion of concrete structure 10 to be treated, as well as any other mechanisms or conditions, such as capillary suction forces, that may affect the holding of internal moisture within concrete structure 10.

Figure 4:
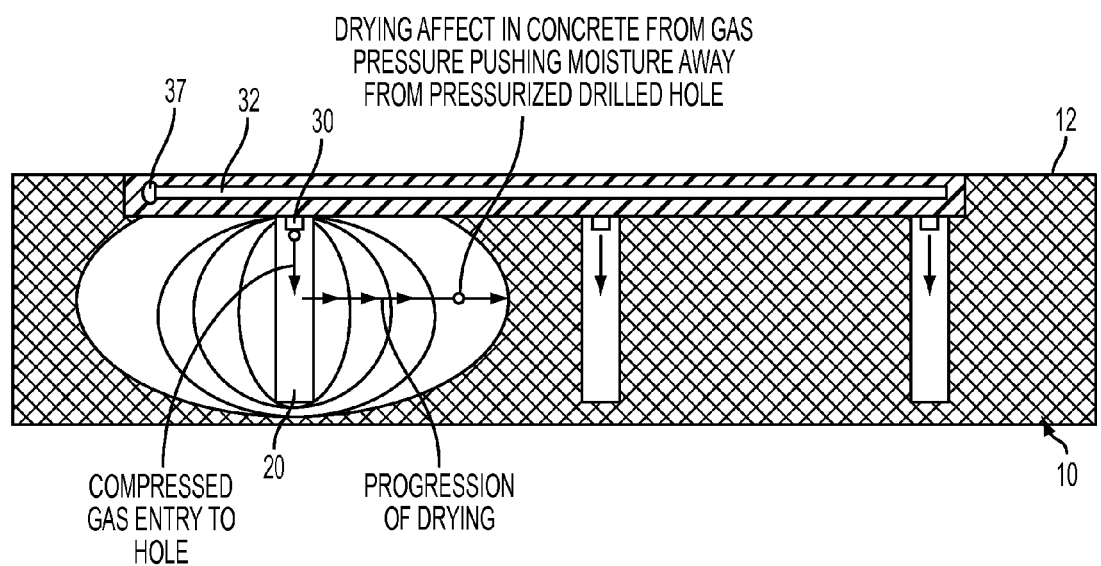
FIG. 4 illustrates the portion of concrete structure of FIG. 3 as pressurized gas is delivered to the cavities within the concrete structure.

FIG. 4 again provides a cross-sectional view of concrete structure 10 and schematically shows delivery of pressurized gas into cavities 20 and their effect on concrete structure 10. As explained above, pressurized gas is supplied through gas distribution line 37 to fluid supply conduit 32, and is delivered from fluid supply conduit 32 into cavities 20 through gas supply nozzles 30. As pressurized gas is fed into the cavities 20 (each cavity 20 preferably being pressurized simultaneously), the gas seeps into concrete structure 10, moving through a network of pores and capillaries within the concrete structure 10 and pushing moisture and liquids to the surface opposite face 12. As it passes into concrete structure 10 from a cavity 20, moisture within the concrete structure 10 is progressively driven further from each cavity 20, and thus lowering the relative humidity of the concrete structure and creating a drying effect that spreads outward from each cavity 20. Depending upon the density of the concrete structure 10, the acting hydrostatic pressure of the moisture, or the relative humidity of the concrete structure 10, will lower until an equilibrium condition is reached. Once an equilibrium condition is achieved in which the internal relative humidity of the concrete structure 10 is below 80%, the risk of gel expansion within concrete structure 10 is minimized, if not eliminated altogether.

In order to maintain relative humidity levels below 80%, the gas is preferably maintained at pressure by continuing to supply pressurized gas from compressed gas source 34 as the already-delivered gas passes into concrete structure 10.

In addition to the supply of pressurized gas, and again with reference to FIG. 2, additional agents, and more particularly a competitive inhibitor 38 may be applied to concrete structure 10 that will prevent the ASR gel from reacting with alkali metals in the concrete. ASR gel in the presence of reactive aggregates, alkali metals, calcium hydroxide and water can form an alkali calcium silicate hydrate gel, which tends to absorb additional water and thus expand. A suitable competitive inhibitor, in contrast, can react with the ASR gel to cause it to become hydrophobic.

A suitable competitive inhibiting agent 38 (FIG. 2) is lithium nitrate, which may be injected into the supply of compressed gas at a valve 39 positioned downstream from compressed gas source 34. By providing lithium nitrate as a competitive inhibitor in this manner, the lithium ion present in solution in the concrete will stabilize the gel against volume changes by making it much less soluble and hydroscopic than otherwise typical ASR gels. The lithium silicate-bearing phases that form within the gels are far less susceptible to deleterious expansion otherwise caused by the uptake of moisture in typical ASR gels, and will stabilize the existing gels against future deleterious expansion. Such supply of lithium nitrate will allow it to flow to the various cavities 20 throughout the network and thus be present to enter the concrete pore structure accessible from each cavity 20. The constant pressure acting on the liquid lithium nitrate (as a result of compressed gas source 34) helps to drive the chemical into the affected gel regions of the aggregate of concrete structure 10. As the lithium nitrate enters into the concrete structure 10, it is absorbed into the ASR gel, causing the ASR gel to become volumetrically stable against moisture uptake in the concrete matrix.

Figure 5:
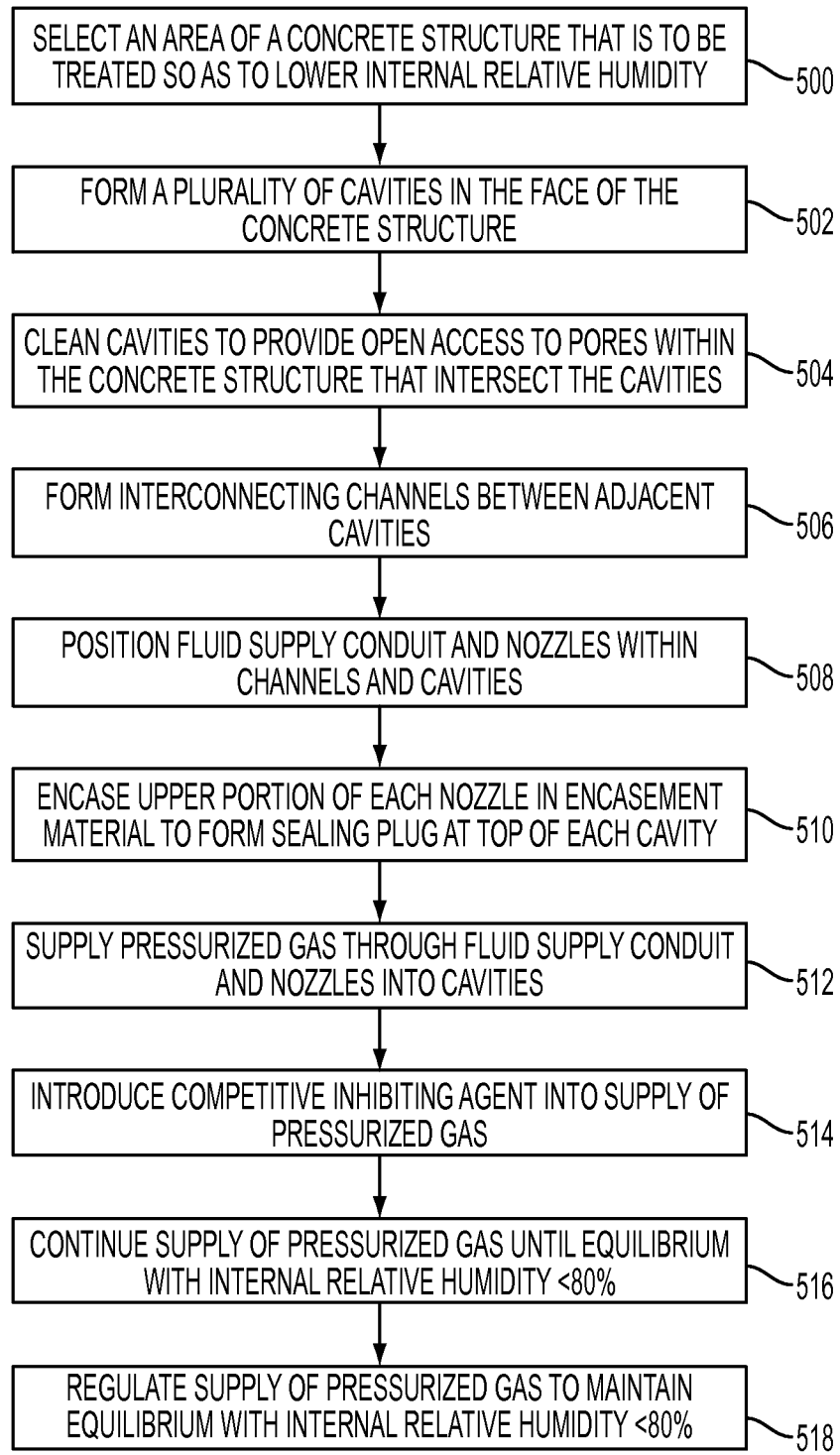
FIG. 5 is a flowchart showing a method for lowering the internal relative humidity inside of a concrete structure in accordance with certain aspects of an embodiment of the invention.

Next, and with reference to FIG. 5, a method is provided for lowering the relative humidity of a concrete structure. First, at step 500, selection is made of an area of a concrete structure that is to be treated so as to lower the internal relative humidity of such structure. Next, at step 502, a plurality of generally cylindrical cavities are cut into the face of the concrete structure, preferably in a uniformly dispersed network throughout the area of the concrete structure that has been selected for treatment. After cavities have been cut into the face of the concrete structure, at step 504 the cavities may be cleaned so as to provide open access to pores within the concrete structure that intersect the cavities. At step 506, channels may be provided between adjacent cavities, thus forming a network of interconnected cavities. Next, at step 508, fluid supply conduit and nozzles are positioned within the channels and cavities, respectively. At step 510, an upper portion of the nozzle in each cavity is encased within an encasement material, which encasement material likewise provides a sealing plug providing an airtight seal at the top of each cavity, as well as a flush surface along the face of the concrete structure. Preferably, the fluid supply conduit that extends between the cavities is likewise encased in such encasement material, further providing a flush surface along the face of the concrete structure. Next, at step 512, pressurized gas is supplied through the fluid supply conduit and nozzles and into the cavities. Optionally, at step 514, a competitive inhibiting agent may be introduced into the supply of pressurized gas, which competitive inhibiting agent with prevent ASR gel within the concrete structure from reacting with alkali metals in the concrete, and that will cause the ASR gel to become hydrophobic. Next, at step 516, the supply of pressurized gas is continued until an equilibrium condition is achieved in which the concrete structure's internal relative humidity is less than 80%. Finally, at step 518, the pressurized gas supply is regulated so as to maintain an equilibrium condition in which the concrete structure's internal relative humidity is less than 80%.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, while the foregoing exemplary embodiment is described as being applied to concrete pipe repair, it may likewise be used for reinforcement and/or repair of steel pipes or pipes of other configurations and materials without departing from the spirit and scope of the invention. It should be understood, therefore, that the invention may be practiced otherwise than as specifically set forth herein.

What is claimed is:

1. A system for lowering the internal relative humidity of a concrete structure, comprising:
   a concrete structure comprising a plurality of cavities extending into a face of said concrete structure and sealed at a top end of each said cavity;
   a gas delivery nozzle positioned within each said cavity; and
   a pressurized gas source in fluid communication with said nozzles and delivering pressurized gas to said cavities at a pressure sufficient to cause said gas to enter into said concrete structure and to lower an internal relative humidity of said concrete structure.

2. The system of claim 1, further comprising a fluid supply conduit fluidly communicating said nozzles with said pressurized gas source.

3. The system of claim 2, further comprising a plurality of channels extending into said face of said concrete structure between said cavities.

4. The system of claim 3, wherein said fluid supply conduit is positioned within said plurality of channels.

5. The system of claim 4, wherein said nozzles and said fluid supply conduit are encased within an encasement material.

6. The system of claim 5, wherein an outer edge of said encasement material is flush with said face of said concrete structure.

7. The system of claim 5, wherein said encasement material comprises epoxy.

8. The system of claim 1, wherein a seal at a top of each said cavity forms an air-tight seal.

9. The system of claim 1, wherein said cavities are arranged in a uniform network of equally spaced apart cavities.

10. The system of claim 1, further comprising a pressure regulator set to supply pressurized gas at a pressure that will maintain an equilibrium state at which an internal relative humidity of the concrete structure is less than 80%.

11. The system of claim 1, further comprising a source of a competitive inhibiting agent in fluid communication with said nozzles, wherein said competitive inhibiting agent is selected for its ability to stabilize ASR gel within said concrete structure against future deleterious expansion due to moisture uptake.

12. The system of claim 11, wherein said competitive inhibiting agent further comprises lithium nitrate.

13. A method for lowering the internal relative humidity of a concrete structure, comprising the steps of:
 selecting an area of a concrete structure that is to be subjected to treatment for lowering an internal relative humidity of said concrete structure;
 forming a plurality of cavities in a face of said concrete structure so that said cavities extend from said face into a body of said concrete structure,
 positioning gas supply nozzles in each said cavity and sealing each said cavity;
 supplying pressurized gas to said cavities through said nozzles; and
 continuing said supply of pressurized gas to said cavities until an equilibrium condition is achieved in which an internal relative humidity of said area of said concrete structure is less than 80%.

14. The method of claim 13, further comprising the step of sealing an upper end of each said cavity so as to form an airtight seal.

15. The method of claim 13, further comprising the step of supplying a competitive inhibiting agent to said cavities through said nozzles, wherein said competitive inhibiting agent is selected for its ability to stabilize ASR gel within said concrete structure against future deleterious expansion due to moisture uptake.

16. The method of claim 15, wherein said competitive inhibiting agent further comprises lithium nitrate.

17. The method of claim 13, further comprising the step of regulating said pressurized gas supply to maintain an equilibrium condition in which said internal relative humidity of said concrete structure is less than 80%.

* * * * *